United States Patent
Pezeshki et al.

(10) Patent No.: US 12,389,313 B2
(45) Date of Patent: Aug. 12, 2025

(54) MEASUREMENTS OF LINEAR COMBINATIONS OF BEAMS

(71) Applicant: QUALCOMM Incorporated, San Diego, CA (US)

(72) Inventors: Hamed Pezeshki, San Diego, CA (US); Mahmoud Taherzadeh Boroujeni, San Diego, CA (US); Arumugam Chendamarai Kannan, San Diego, CA (US); Tao Luo, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 17/656,379

(22) Filed: Mar. 24, 2022

(65) Prior Publication Data

US 2023/0308992 A1    Sep. 28, 2023

(51) Int. Cl.
*H04W 48/16* (2009.01)
*H04L 5/00* (2006.01)
*H04W 24/10* (2009.01)
*H04W 72/044* (2023.01)
*H04W 72/54* (2023.01)

(52) U.S. Cl.
CPC .......... *H04W 48/16* (2013.01); *H04L 5/0046* (2013.01); *H04W 24/10* (2013.01); *H04W 72/046* (2013.01); *H04W 72/54* (2023.01)

(58) Field of Classification Search
None
See application file for complete search history.

(56) References Cited

U.S. PATENT DOCUMENTS

| | | | |
|---|---|---|---|
| 11,750,267 B1* | 9/2023 | Raghavan | H04B 7/0617 375/347 |
| 2007/0195908 A1* | 8/2007 | Attar | H04L 25/0226 375/267 |
| 2018/0131429 A1* | 5/2018 | Park | H04B 7/063 |
| 2018/0234153 A1* | 8/2018 | Lincoln | H04W 52/0274 |
| 2019/0052377 A1* | 2/2019 | Hwang | H04L 5/0035 |
| 2019/0260434 A1* | 8/2019 | Park | H04B 7/0479 |
| 2019/0319689 A1* | 10/2019 | Wu | H04B 7/066 |
| 2020/0304186 A1* | 9/2020 | Venugopal | H04L 5/0048 |
| 2022/0038163 A1* | 2/2022 | Va | H04B 7/0456 |
| 2022/0321176 A1* | 10/2022 | Vieira | H04B 7/0695 |
| 2023/0131745 A1* | 4/2023 | Huang | H04B 7/0695 375/262 |
| 2023/0291456 A1* | 9/2023 | Farmanbar | H04B 7/0626 |

* cited by examiner

*Primary Examiner* — Anh Vu H Ly
(74) *Attorney, Agent, or Firm* — Harrity & Harrity, LLP

(57) ABSTRACT

Various aspects of the present disclosure generally relate to wireless communication. In some aspects, a user equipment (UE) may measure one or more linear combinations, of a set of beams, from a radio access network (RAN) node. Accordingly, the UE may transmit a report, based at least in part on measuring the one or more linear combinations, to the RAN node. The one or more linear combinations may be indicated in one or more rules stored in a memory of the UE or may be indicated in a system information block or a radio resource configuration message. Numerous other aspects are described.

25 Claims, 10 Drawing Sheets

MEASUREMENTS OF LINEAR COMBINATIONS OF BEAMS

FIELD OF THE DISCLOSURE

Aspects of the present disclosure generally relate to wireless communication and to techniques and apparatuses for measuring linear combinations of beams.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include measuring one or more linear combinations, of a set of beams, from a radio access network (RAN) node. The method may further include transmitting a report, based at least in part on the measuring, to the RAN node.

Some aspects described herein relate to an apparatus for wireless communication at a UE. The apparatus may include a memory and one or more processors coupled to the memory. The one or more processors may be configured to measure one or more linear combinations, of a set of beams, from a RAN node. The one or more processors may further be configured to transmit a report, based at least in part on the measuring, to the RAN node.

Some aspects described herein relate to a non-transitory computer-readable medium that stores a set of instructions for wireless communication by a UE. The set of instructions, when executed by one or more processors of the UE, may cause the UE to measure one or more linear combinations, of a set of beams, from a RAN node. The set of instructions, when executed by one or more processors of the UE, may further cause the UE to transmit a report, based at least in part on the measuring, to the RAN node.

Some aspects described herein relate to an apparatus for wireless communication. The apparatus may include means for measuring one or more linear combinations, of a set of beams, from a RAN node. The apparatus may further include means for transmitting a report, based at least in part on the measuring, to the RAN node.

Some aspects described herein relate to a method of wireless communication performed by a RAN node. The method may include transmitting one or more linear combinations of a set of beams. The method may further include receiving a report including one or more measurements of the one or more linear combinations.

Some aspects described herein relate to an apparatus for wireless communication at a RAN node. The apparatus may include a memory and one or more processors coupled to the memory. The one or more processors may be configured to transmit one or more linear combinations of a set of beams. The one or more processors may further be configured to receive a report including one or more measurements of the one or more linear combinations.

Some aspects described herein relate to a non-transitory computer-readable medium that stores a set of instructions for wireless communication by a RAN node. The set of instructions, when executed by one or more processors of the RAN node, may cause the RAN node to transmit one or more linear combinations of a set of beams. The set of instructions, when executed by one or more processors of the RAN node, may further cause the RAN node to receive a report including one or more measurements of the one or more linear combinations.

Some aspects described herein relate to an apparatus for wireless communication. The apparatus may include means for transmitting one or more linear combinations of a set of beams. The apparatus may further include means for receiving a report including one or more measurements of the one or more linear combinations.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
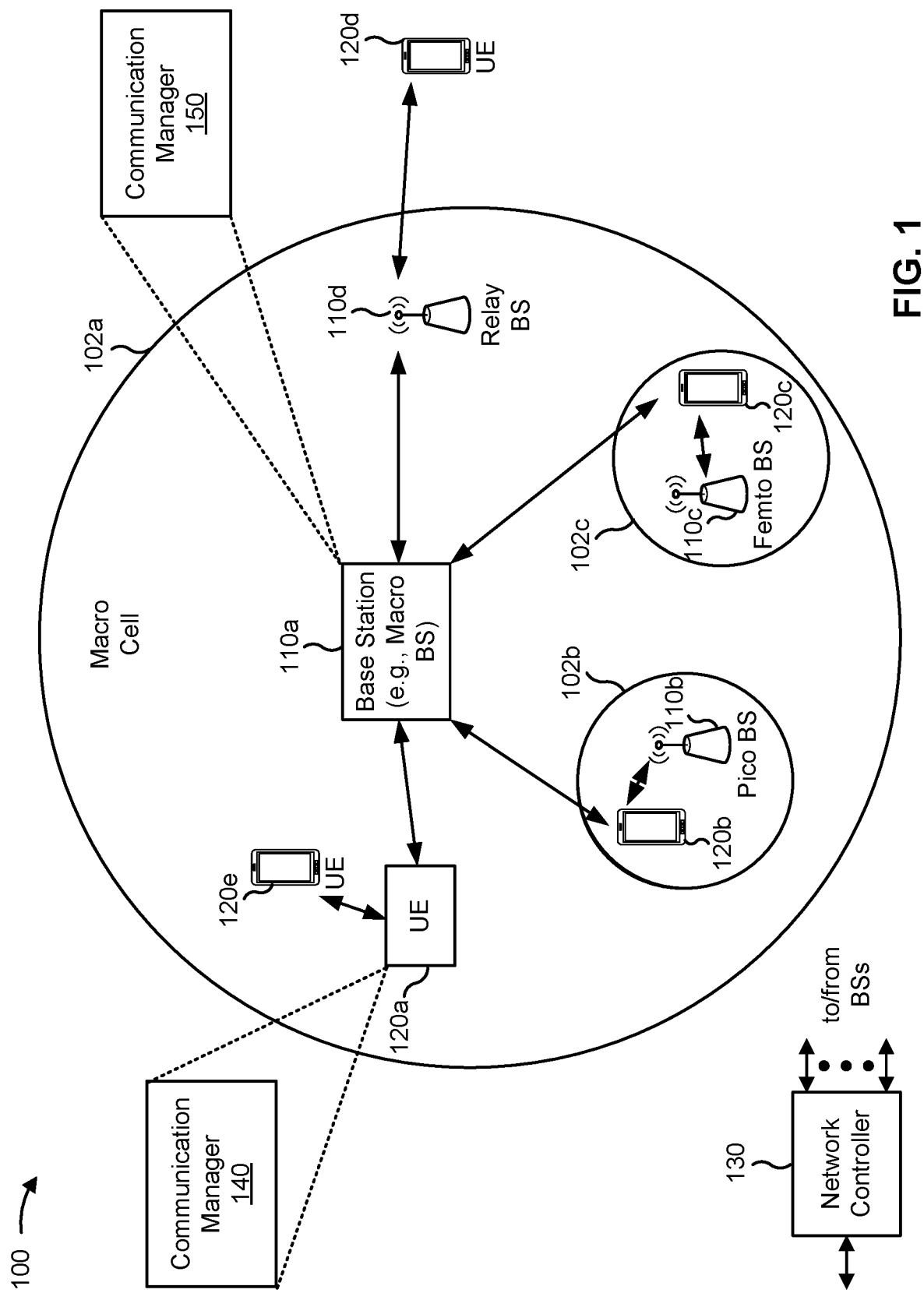
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may measure one or more linear combinations, of a set of beams, from a radio access network (RAN) node (e.g., the base station 110) and transmit a report, based at least in part on the measuring, to the RAN node. Additionally, or alternatively, the communication manager 140 may perform one or more other operations described herein.

In some aspects, a RAN node (e.g., the base station 110) may include a communication manager 150. As described in more detail elsewhere herein, the communication manager 150 may transmit one or more linear combinations of a set of beams and receive a report including one or more measurements of the one or more linear combinations. Additionally, or alternatively, the communication manager 150 may perform one or more other operations described herein.

As indicated above, FIG. 1 is provided as an example. Other examples may differ from what is described with regard to FIG. 1.

Figure 2:
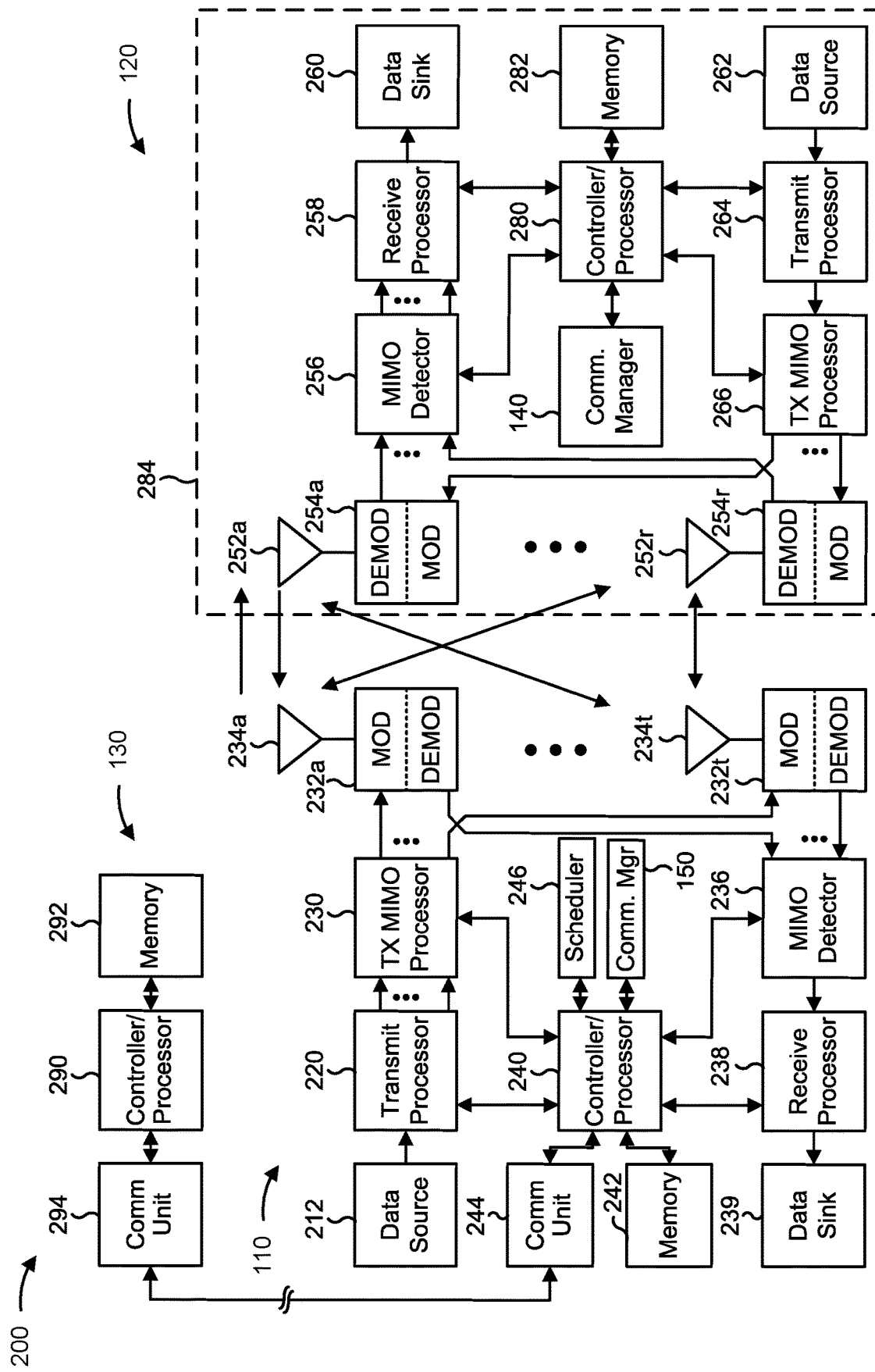
FIG. 2 is a diagram illustrating an example of a base station in communication with a user equipment in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T>1). The UE 120 may be equipped with a set of antennas 252a through 252r, such as R antennas (R>1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the base station 110, the controller/processor 280 of the UE 120, and/or any other component(s) of FIG. 2 may perform one or more techniques associated with measuring linear combinations of beams, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples. In some aspects, the RAN node described herein is the base station 110, is included in the base station 110, or includes one or more components of the base station 110 shown in FIG. 2.

In some aspects, a UE (e.g., UE 120 and/or apparatus 900 of FIG. 9) may include means for measuring one or more linear combinations, of a set of beams, from a RAN node (e.g., base station 110 and/or apparatus 1000 of FIG. 10); and/or means for transmitting a report, based at least in part on the measuring, to the RAN node. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a RAN node (e.g., base station 110 and/or apparatus 1000 of FIG. 10) may include means for transmitting one or more linear combinations of a set of beams; and/or means for receiving a report including one or more measurements of the one or more linear combinations. In some aspects, the means for the RAN node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
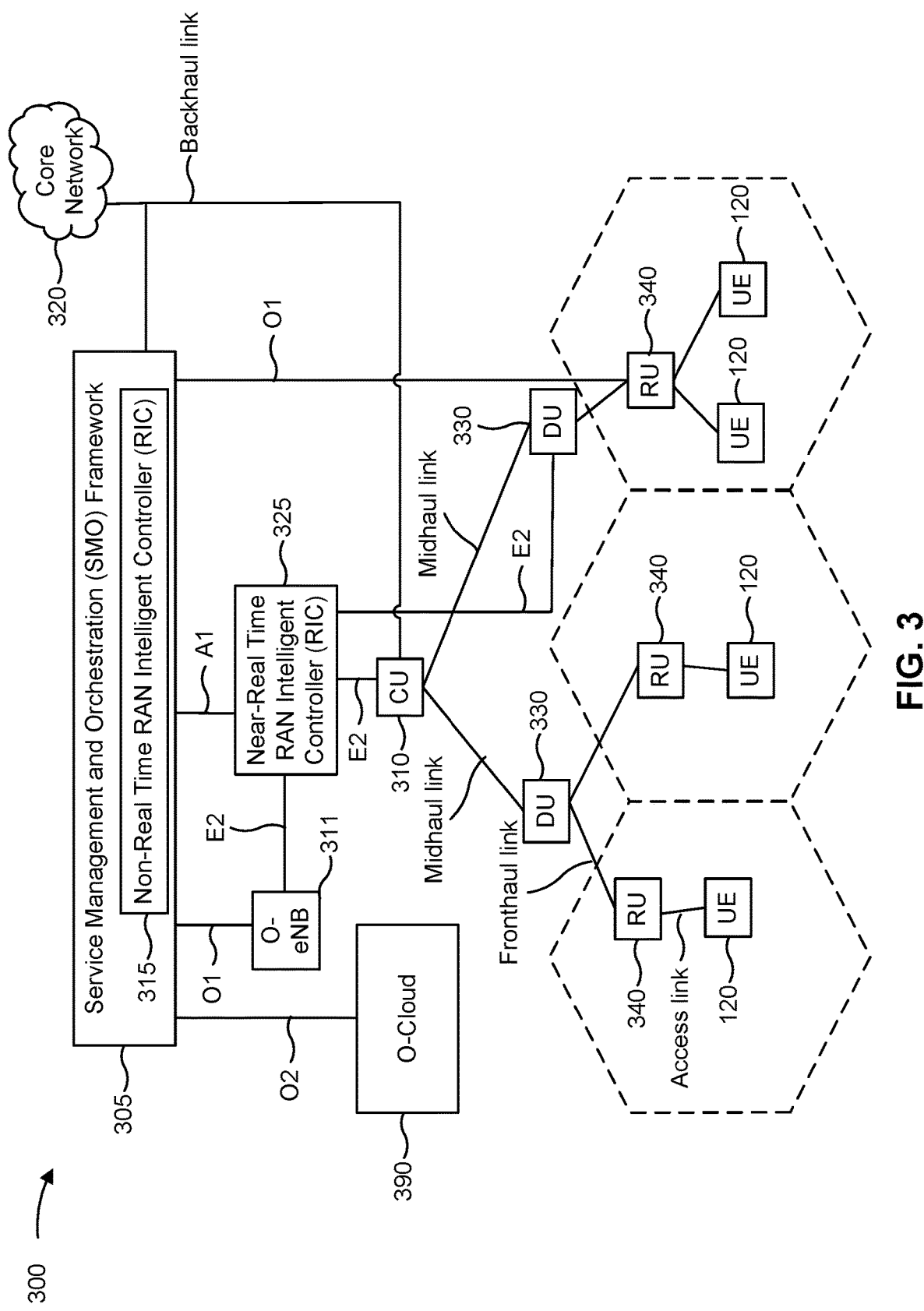
FIG. 3 is a diagram illustrating an example of a disaggregated base station architecture, in accordance with the present disclosure.

FIG. 3 is a diagram illustrating an example 300 disaggregated base station architecture, in accordance with the present disclosure. Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a base station (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units (e.g., a virtual centralized unit (VCU), a virtual distributed unit (VDU), or a virtual radio unit (VRU)).

Base-station-type operation or network design may consider aggregation characteristics of base station functionality. For example, disaggregated base stations may be utilized in an integrated access backhaul (IAB) network, an open RAN (O-RAN), such as the network configuration sponsored by the O-RAN Alliance, or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (MC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit—User Plane (CU-UP)), control plane functionality (e.g., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over-the-air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an AI interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT MC 315 may receive parameters or external enrichment information from external servers. Such information may be utilized by the Near-RT MC 325 and may be received at the SMO Framework 305 or the Non-RT MC 315 from non-network data sources or from network functions. In some examples, the Non-RT MC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as AI policies).

As indicated above, FIG. 3 is provided as an example. Other examples may differ from what is described with regard to FIG. 3.

A network entity may be configured to generate and transmit directional beams (e.g., via an RU). Accordingly, to determine a best downlink beam to transmit to a UE, the network entity may sweep through a set of beams (e.g., by instructing the RU to transmit synchronization signal blocks (SSBs), channel state information reference signals (CSI-RSs), and/or other types of reference signals using each beam from the set of beams). However, sweeping through the set of beams costs power and processing resources, as well as increases latency before the network entity may select the downlink beam.

One technique to conserve power and processing resources as well as reduce latency is to use a prediction model. For example, the network entity may transmit a first subset, of the set of beams (e.g., by instructing the RU to transmit SSBs, CSI-RSs, and/or other types of reference signals using each beam from the first subset). Accordingly, the UE may measure the first subset and transmit a set of measurements corresponding to the first subset to the network entity (e.g., by transmitting a channel state information (CSI) report including the set of measurements). The network entity may then determine a beam, of the set of beams, to use by applying the prediction model to the set of measurements. For example, the prediction model may predict one or more beams expected to meet predefined criteria (e.g., one or more beams expected to have the highest measurement values of a particular type of measurement performed by the UE, such as an RSRP). In some aspects, the prediction model may predict the one or more beams based on a signature (e.g., a spatial signature) formed by measurement values included within the set of measurements. Additionally, or alternatively, the prediction model may predict the one or more beams based on one or more angular measurements. For example, the angular information may include angle-of-arrival (AoA) information associated with the first subset and/or angle-of-departure (AoD) information associated with the first subset.

The prediction model may include a neural network, a regression, and/or another type of model generated using training measurements, of a second subset of the set of beams, from the UE.

To improve accuracy, the network entity may generate a plurality of prediction models, where each prediction model is associated with a different coverage zone (e.g., a tracking area and/or another geographic area associated with a cell served by the network entity and/or an RU of the network entity). Accordingly, based on a location of the UE, the network entity may apply the prediction model associated with the coverage zone including the location.

Some techniques and apparatuses described herein enable a UE (e.g., UE 120 and/or apparatus 900 of FIG. 9) to measure linear combinations of beams. As a result, a RAN node (e.g., base station 110 and/or apparatus 1000 of FIG. 10) may more accurately predict a beam to use to transmit to the UE 120 (e.g., using a prediction model, such as a model based on machine learning). More accurate prediction results in improved communication reliability and/or quality between the RAN node and the UE 120, which reduces latency and conserves power and processing resources by reducing retransmissions.

Figure 4:
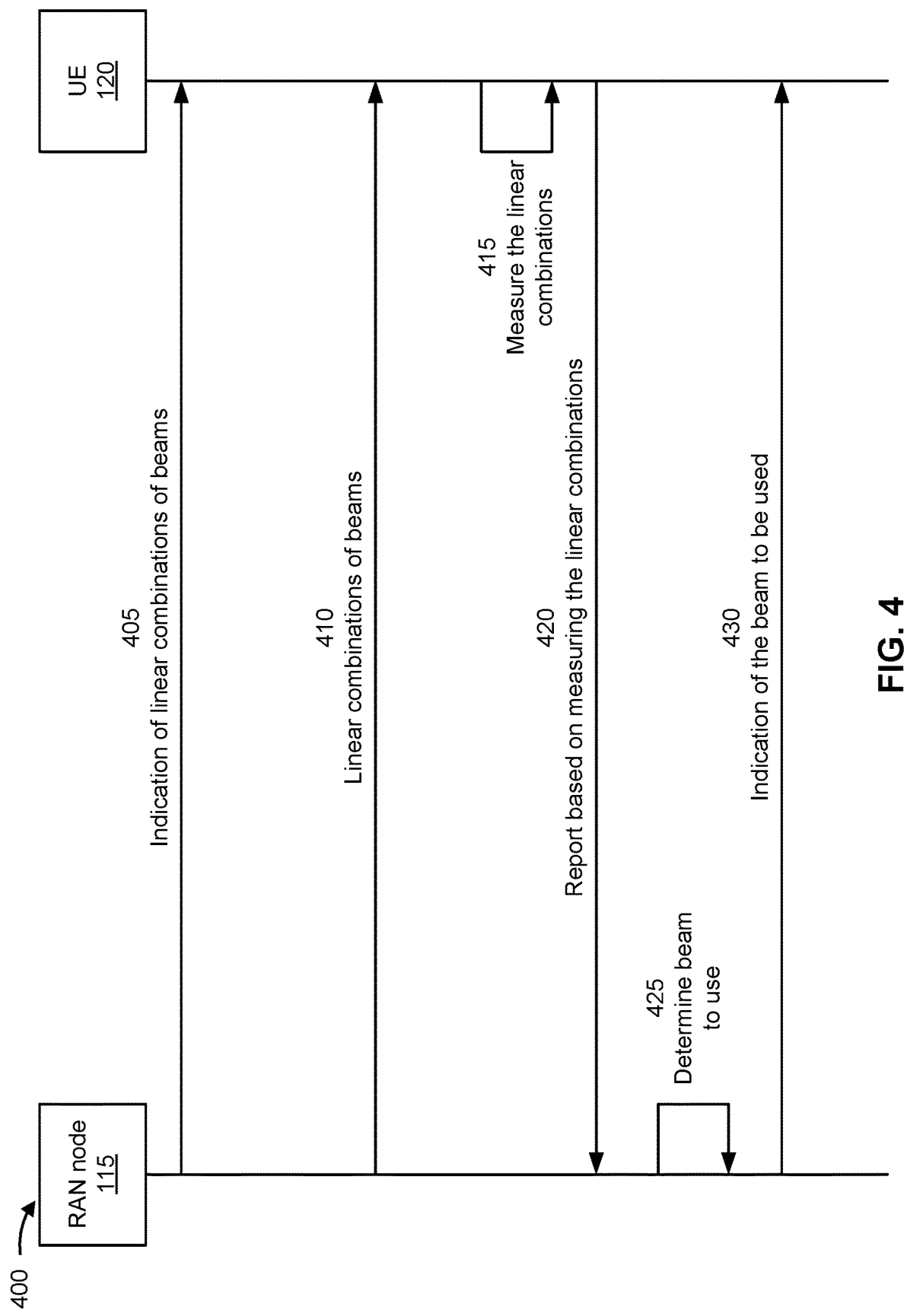
FIG. 4 is a diagram illustrating an example associated with measuring linear combinations of beams, in accordance with the present disclosure.

FIG. 4 is a diagram illustrating an example 400 associated with measuring linear combinations of beams, in accordance with the present disclosure. As shown in FIG. 4, a RAN node 115 and a UE 120 may communicate with one another (e.g., on a wireless network, such as network 100 of FIG. 1). In some aspects, the RAN node 115 may use a disaggregated base station architecture (e.g., as described in connection with FIG. 3) such that an RU wireless communicates with the UE 120 based on digital and/or analog signals from a DU and/or a CU.

In example 400, the RAN node 115 may communicate with the UE 120 using a set of beams. For example, the set of beams may include SSB beams, CSI-RS beams, and/or beams for another type of reference signal.

As shown in connection with reference number 405, the RAN node 115 may transmit, and the UE 120 may receive, an indication of the one or more linear combinations. In some implementations, the indication may be included in a broadcast message, such as in a system information block (SIB). For example, the indication may be transmitted to all UEs served by the RAN node 115. Alternatively, the indication may be included in an RRC message. For example, the indication may be transmitted to the UE 120 in particular.

The indication may include both an indicator of the one or more linear combinations and an indicator of a temporal order in which the linear combination(s) will be transmitted by the RAN node 115. Additionally, the indication may include an indicator of a start time (e.g., by indicating an offset from a current time) and an indicator of a duration (e.g., a total duration during which the linear combination(s) will be transmitted by the RAN node 115 and/or a duration during which each linear combination will be transmitted by the RAN node 115). Example temporal patterns for linear combinations are described in connection with FIGS. 5 and 6.

Each linear combination may be associated with a transmission configuration, such as a TCI state (e.g., represented by a TCI-State data structure, as defined in 3GPP specifications and/or another standard). For example, an RU of the RAN node 115 and the UE 120 may be configured for beamformed communications, where the RU of the RAN node 115 may transmit in the direction of the UE 120 using a directional BS transmit beam, and the UE 120 may receive the transmissions using a directional UE receive beam. Each BS transmit beam may have an associated beam identifier (ID), a beam direction, or beam symbols, among other examples. Additionally, a downlink beam, such as a BS transmit beam or a UE receive beam, may be associated with a TCI state. A TCI state may indicate a directionality or a characteristic of the downlink beam, such as one or more quasi-co-location (QCL) properties of the downlink beam. For example, a QCL property may be indicated using a qcl-Type indicator within a QCL-Info data structure, as defined in 3GPP specifications and/or another standard. A QCL property may include, for example, a Doppler shift, a Doppler spread, an average delay, a delay spread, or spatial receive parameters, among other examples. In some aspects, a TCI state may be further associated with an antenna port, an antenna panel, and/or a TRP. A TCI state may be associated with one downlink reference signal set (for example, a tracking reference signal (TRS), an SSB, and/or an aperiodic, periodic, or semi-persistent CSI-RS) for different QCL types (for example, QCL types for different combinations of Doppler shift, Doppler spread, average delay, delay spread, or spatial receive parameters, among other examples). For example, the downlink reference signal may be indicated using a referenceSignal indicator, within a QCL-Info data structure, as defined in 3GPP specifications and/or another standard. In cases where the QCL type indicates spatial receive parameters, the QCL type may correspond to analog receive beamforming parameters of a UE receive beam at the UE 120.

In some aspects, the indication includes one or more QCL indications that associate each linear combination, of the one or more linear combinations, with a plurality of beams of the set of beams. Accordingly, each linear combination may be indicated in a TCI state associated with multiple reference signals (e.g., multiple referenceSignal indicators or a new indicator associated with multiple reference signals).

In some aspects, the indication includes a set of coefficients for each linear combination. For example, each linear combination may comprise a summation of matrices associated with the plurality of beams, of the set of beams, that are associated with the linear combination. Accordingly, the set of coefficients may be applied to the matrices before summation in order to determine the linear combination.

Alternatively to the indication transmitted by the RAN node 115, the one or more linear combinations may be indicated in one or more rules stored in a memory of the UE 120 and a memory of the RAN node 115. For example, the one or more rules may indicate a temporal pattern and a set of coefficients to use for one or more linear combinations associated with SSBs for initial acquisition. Accordingly, the one or more rules may include one or more tables of patterns and coefficient sets (e.g., based on subcarrier spacing (SCS) associated with the SSBs, frequency bands associated with the SSBs, and/or other physical properties associated with the SSBs). The one or more rules may be programmed (and/or otherwise preconfigured) into the UE 120 and the RAN node 115 according to 3GPP specifications and/or another standard.

Accordingly, as shown in connection with reference number 410, the RAN node 115 may transmit, and the UE 120 may receive, the one or more linear combinations of a set of beams. For example, the RAN node 115 may instruct an RU to transmit SSBs, CSI-RSs, and/or other types of reference signals using the linear combinations (e.g., by summing precoder matrices weighted according to the set of coefficients) according to the temporal pattern.

Therefore, as shown in connection with reference number 415, the UE 120 may measure the one or more linear combinations. For example, the UE 120 may determine an RSRP and/or another L1 measurement, a layer indicator (L1), a precoding matrix indicator (PMI), a rank indicator (RI), and/or another direct and/or derived measurement for each linear combination. Accordingly, as shown in connection with reference number 420, the UE 120 may transmit, and the RAN node 115 may receive, a report, based at least in part on the UE 120 measuring the linear combination(s). For example, the report may include a CSI report for the linear combination(s).

As shown in connection with reference number 425, the RAN node 115 may select a beam, from the set of beams, to be used based on the report from the UE 120. For example, the beam to be used by the RAN node 115 may be selected using a predication model (e.g., incorporating machine learning) and measurements of the one or more linear combinations included in the report.

Accordingly, as shown in connection with reference number 430, the RAN node 115 may transmit, and the UE 120 may receive, an indication of a beam, of the set of beams, to be used by the RAN node 115 (e.g., for the RU to use to transmit to the UE 120). As a result, the RAN node 115 may instruct the RU to transmit control information and data to the UE 120 using the indicated beam.

By using techniques as described in connection with FIG. 4, the RAN node 115 more accurately predicts the beam to use to transmit to the UE 120 (e.g., using the prediction model). More accurate prediction results in improved communication reliability and/or quality between the RAN node 115 and the UE 120, which reduces latency and conserves power and processing resources by reducing retransmissions.

As indicated above, FIG. 4 is provided as an example. Other examples may differ from what is described with respect to FIG. 4.

Figure 5:
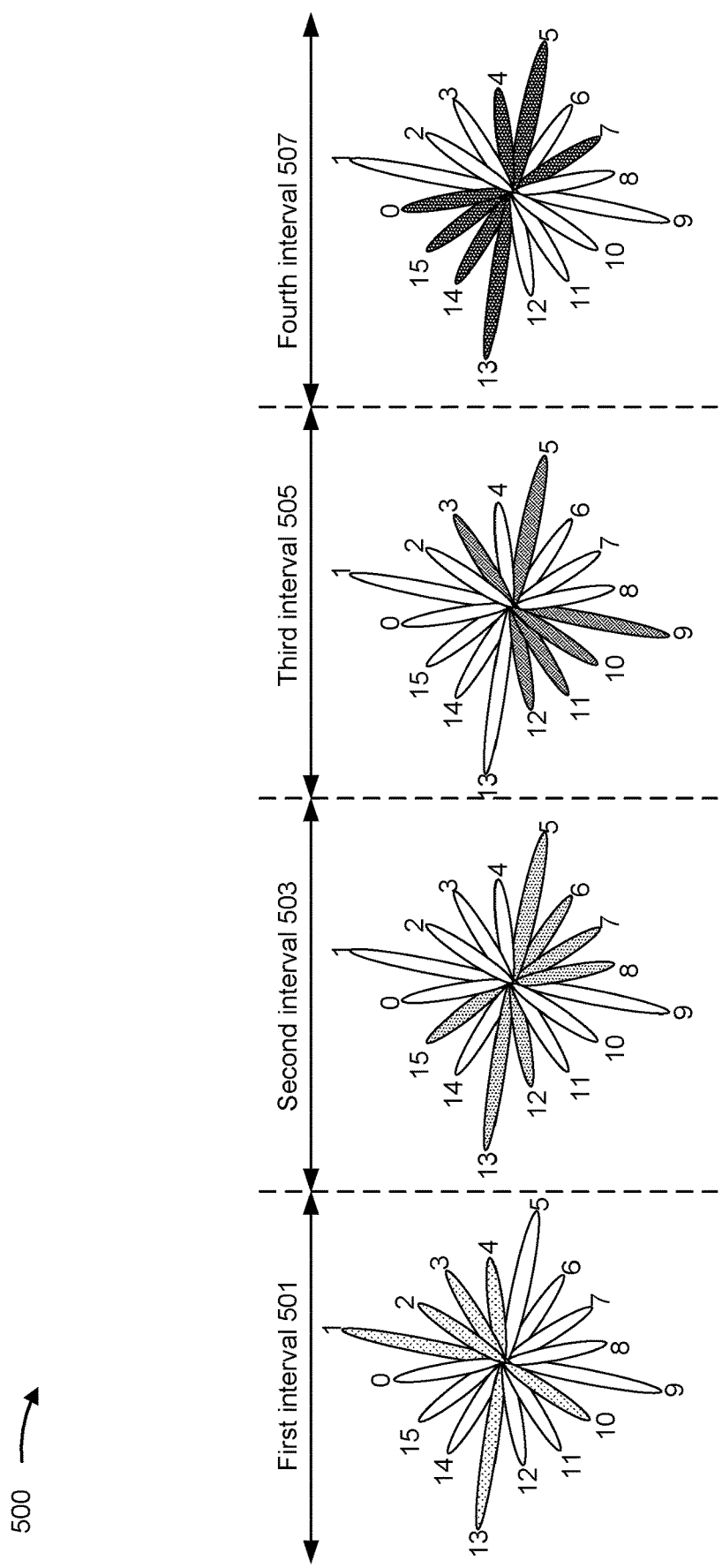
FIGS. 5 and 6 are diagrams illustrating examples associated with linear combinations of beams, in accordance with the present disclosure.

FIG. 5 is a diagram illustrating an example 500 associated with linear combinations of beams, in accordance with the present disclosure. As shown in FIG. 5, a RAN node (e.g., RAN node 115) may transmit four linear combinations of a set of sixteen beams for a UE (e.g., UE 120) to measure. For example, during a first interval 501, the RAN node 115 may transmit a reference signal using a linear combination of beam #1, beam #2, beam #3, beam #4, beam #10, and beam #13. Similarly, during a second interval 503, the RAN node 115 may transmit a reference signal using a linear combination of beam #5, beam #6, beam #7, beam #8, beam #12, beam #13, and beam #15. During a third interval 505, the RAN node 115 may transmit a reference signal using a linear combination of beam #3, beam #5, beam #9, beam #10, beam #11, and beam #12, and during a fourth interval 507, the RAN node 115 may transmit a reference signal using a linear combination of beam #0, beam #4, beam #5, beam #7, beam #13, beam #14, and beam #15. The intervals 501, 503, 505, and 507 may each have a same duration. Alternatively, at least two of the intervals 501, 503, 505, and 507 may have different durations.

Although described using four linear combinations, the RAN node 115 may use fewer linear combinations (e.g., three combinations, two combinations, or one combination) or additional linear combinations (e.g., five combinations, six combinations, and so on). Additionally, or alternatively, although described using a set of sixteen beams, the RAN node 115 may use fewer beams (e.g., fifteen beams, fourteen beams, and so on) or additional beams (e.g., seventeen beams, eighteen beams, and so on).

As indicated above, FIG. 5 is provided as an example. Other examples may differ from what is described with respect to FIG. 5.

Figure 6:
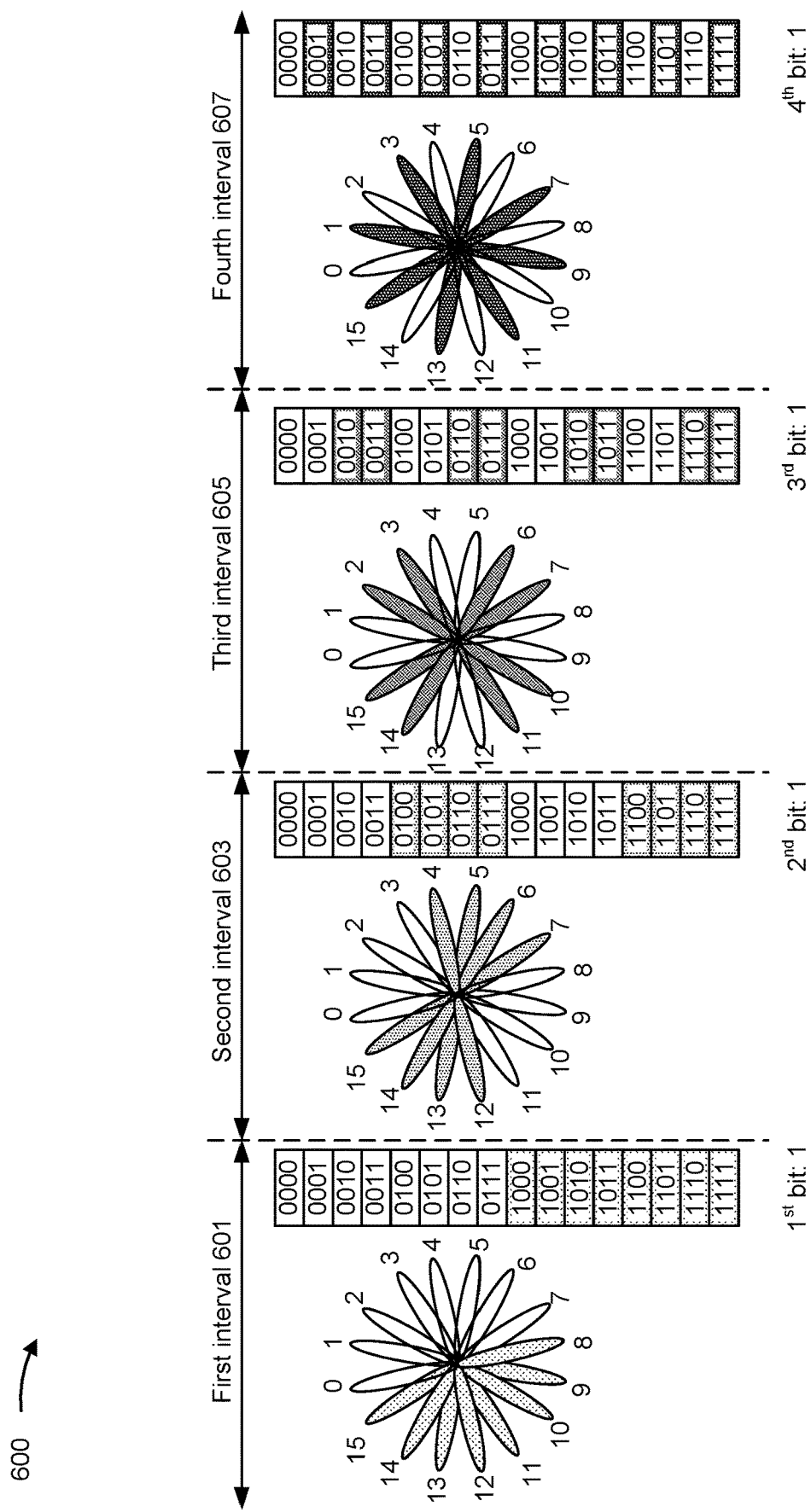

FIG. 6 is a diagram illustrating an example 600 associated with linear combinations of beams, in accordance with the present disclosure. Similar to example 500, in example 600, a RAN node (e.g., RAN node 115) may transmit four linear combinations of a set of sixteen beams for a UE (e.g., UE 120) to measure. As further shown in FIG. 6, each beam may be assigned an index from 0 to 16 that can be expressed using four bits. Accordingly, the RAN node 115 may generate each linear combination based on the bits. For example, in FIG. 6, during a first interval 601, the RAN node 115 may transmit a reference signal using a linear combination of all beams associated with indices including a value of "1" in a first bit, and during a second interval 603, the RAN node 115 may transmit a reference signal using a linear combination of all beams associated with indices including a value of "1" in a second bit. Similarly, during a third interval 605, the RAN node 115 may transmit a reference signal using a linear combination of all beams associated with indices including a value of "1" in a third bit, and during a fourth interval 607, the RAN node 115 may transmit a reference signal using a linear combination of all beams associated with indices including a value of "1" in a fourth bit.

The intervals 601, 603, 605, and 607 may each have a same duration. Alternatively, at least two of the intervals 601, 603, 605, and 607 may have different durations.

Although described using four linear combinations, the RAN node 115 may use fewer linear combinations (e.g., three combinations, two combinations, or one combination) or additional linear combinations (e.g., five combinations, six combinations, and so on). Additionally, or alternatively, although described using a set of sixteen beams, the RAN node 115 may use fewer beams (e.g., fifteen beams, fourteen beams, and so on) or additional beams (e.g., seventeen beams, eighteen beams, and so on).

As indicated above, FIG. 6 is provided as an example. Other examples may differ from what is described with respect to FIG. 6.

Figure 7:
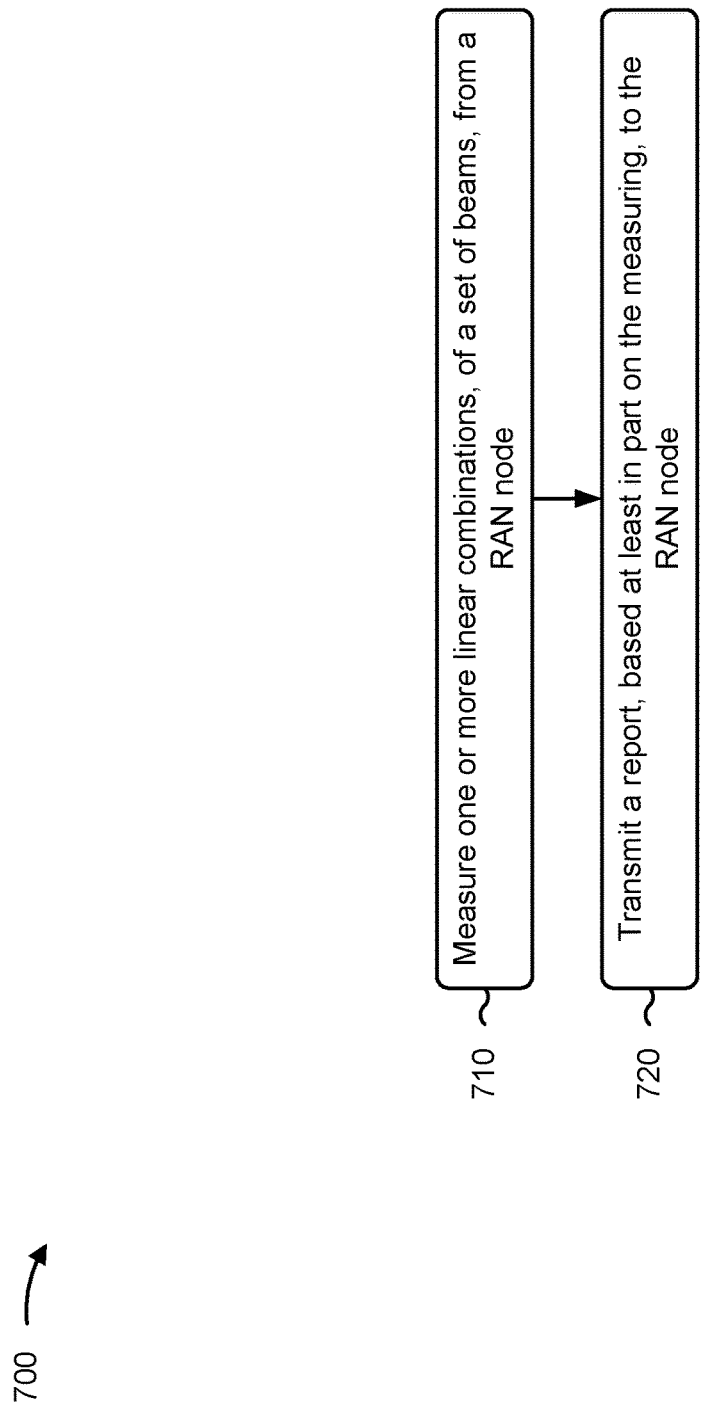
FIGS. 7 and 8 are diagrams illustrating example processes associated with measuring linear combinations of beams, in accordance with the present disclosure.

FIG. 7 is a diagram illustrating an example process 700 performed, for example, by a UE, in accordance with the present disclosure. Example process 700 is an example where the UE (e.g., UE 120 and/or apparatus 900 of FIG. 9) performs operations associated with measuring linear combinations of beams.

As shown in FIG. 7, in some aspects, process 700 may include measuring one or more linear combinations, of a set of beams, from a RAN node (e.g., base station 110 and/or apparatus 1000 of FIG. 10) (block 710). For example, the UE (e.g., using communication manager 140 and/or measurement component 908, depicted in FIG. 9) may measure one or more linear combinations, of a set of beams, from a RAN node, as described herein.

As further shown in FIG. 7, in some aspects, process 700 may include transmitting a report, based at least in part on the measuring, to the RAN node (block 720). For example, the UE (e.g., using communication manager 140 and/or transmission component 904, depicted in FIG. 9) may transmit a report, based at least in part on the measuring, to the RAN node, as described herein.

Process 700 may include additional aspects, such as any single aspect or any combination of aspects described below and/or in connection with one or more other processes described elsewhere herein.

Figure 9:
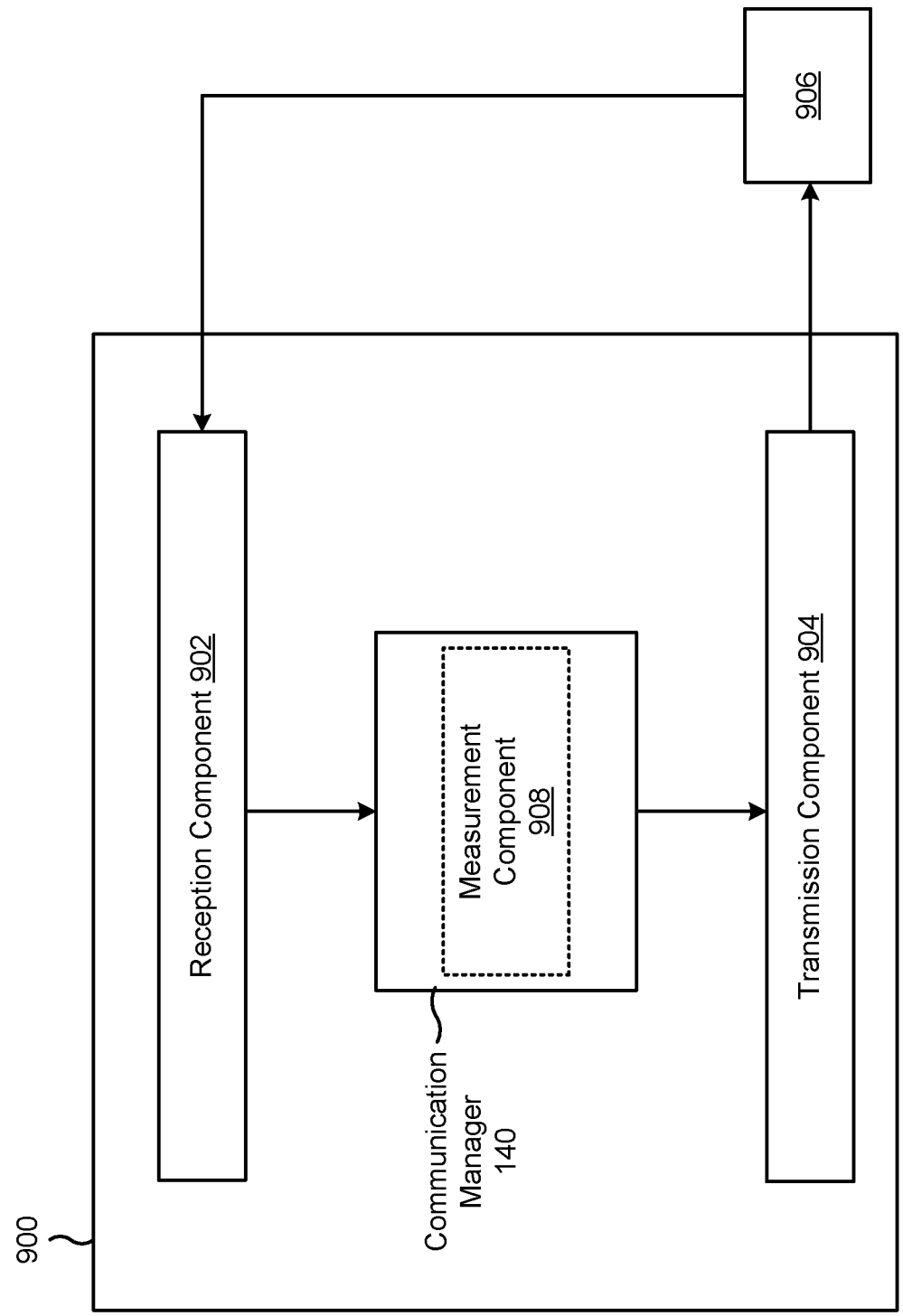
FIGS. 9 and 10 are diagrams of example apparatuses for wireless communication, in accordance with the present disclosure.

In a first aspect, process 700 further includes receiving (e.g., using communication manager 140 and/or reception component 902, depicted in FIG. 9) an indication of a beam, of the set of beams, to be used by the RAN node.

In a second aspect, alone or in combination with the first aspect, the set of beams comprises SSB beams.

In a third aspect, alone or in combination with one or more of the first and second aspects, the set of beams comprises CSI-RS beams.

In a fourth aspect, alone or in combination with one or more of the first through third aspects, the one or more linear combinations are indicated in one or more rules stored in a memory of the UE.

In a fifth aspect, alone or in combination with one or more of the first through fourth aspects, process 700 further includes receiving (e.g., using communication manager 140 and/or reception component 902) an indication of the one or more linear combinations in an SIB or an RRC message.

In a sixth aspect, alone or in combination with one or more of the first through fifth aspects, the indication comprises one or more QCL indications that associate each linear combination, of the one or more linear combinations, with a plurality of beams of the set of beams.

In a seventh aspect, alone or in combination with one or more of the first through sixth aspects, the indication includes a set of coefficients for each linear combination.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
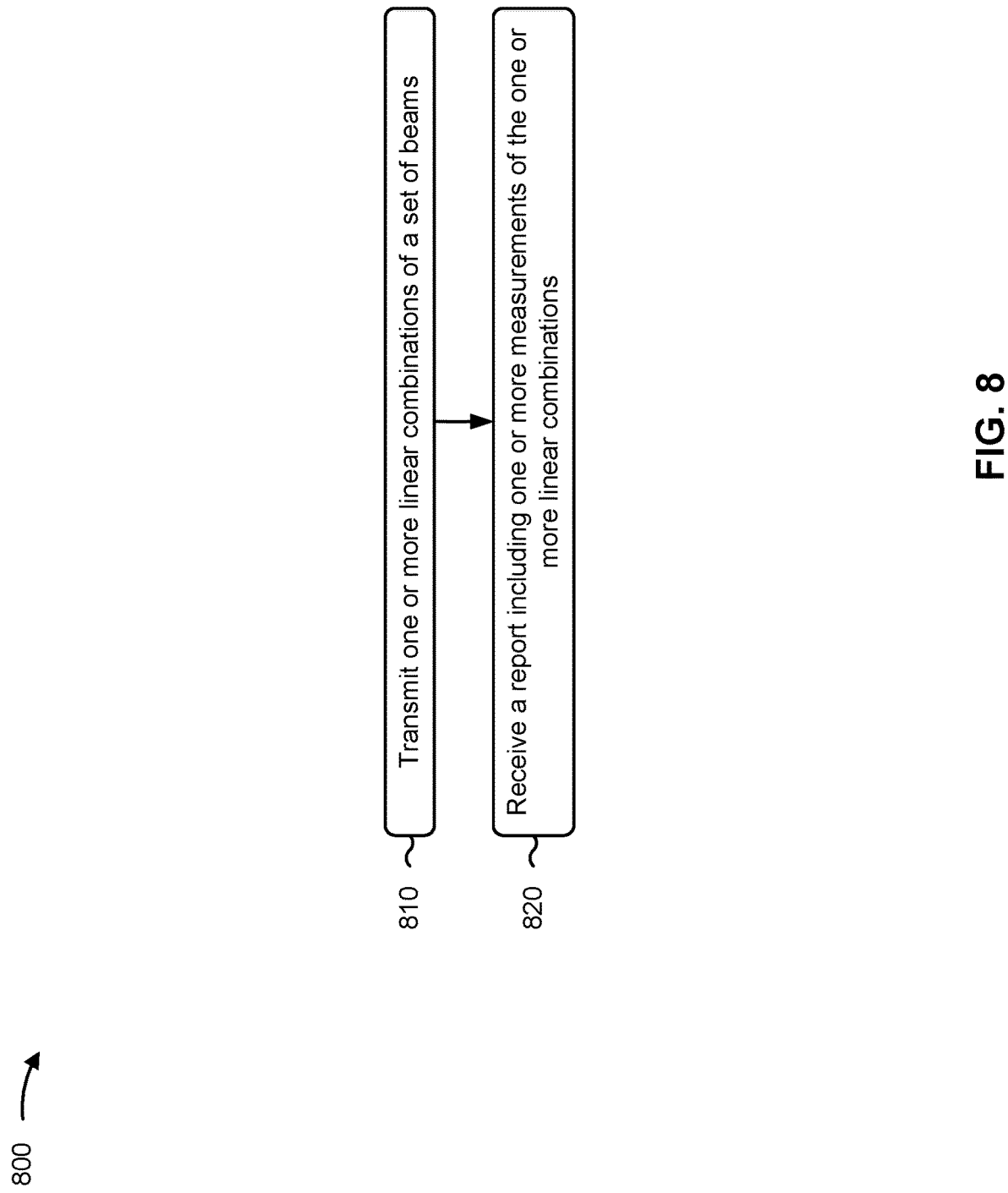

FIG. 8 is a diagram illustrating an example process 800 performed, for example, by a RAN node, in accordance with the present disclosure. Example process 800 is an example where the RAN node (e.g., RAN node 115 and/or apparatus 1000 of FIG. 10) performs operations associated with using measurements of linear combinations of beams.

As shown in FIG. 8, in some aspects, process 800 may include transmitting one or more linear combinations of a set of beams (block 810). For example, the RAN node (e.g., using communication manager 150 and/or transmission component 1004, depicted in FIG. 10) may transmit one or more linear combinations of a set of beams, as described herein.

As further shown in FIG. 8, in some aspects, process 800 may include receiving a report including one or more measurements of the one or more linear combinations (block 820). For example, the RAN (e.g., using communication manager 150 and/or reception component 1002, depicted in FIG. 10) may receive a report including one or more measurements of the one or more linear combinations, as described herein.

Process 800 may include additional aspects, such as any single aspect or any combination of aspects described below and/or in connection with one or more other processes described elsewhere herein.

In a first aspect, process 800 further includes transmitting (e.g., using communication manager 150 and/or transmission component 1004) an indication of a beam, of the set of beams, to be used by the RAN node.

Figure 10:
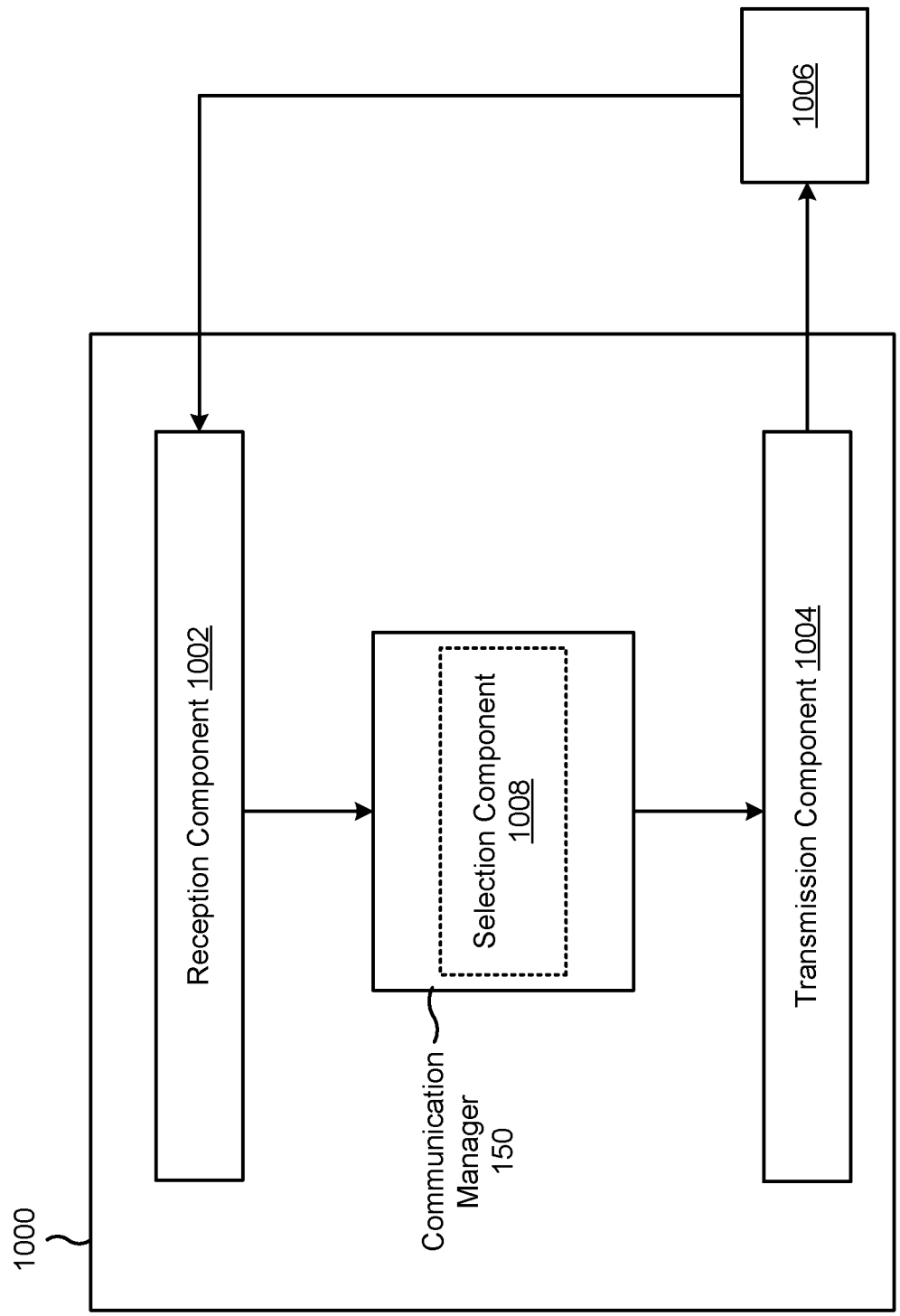

In a second aspect, alone or in combination with the first aspect, the beam to be used by the RAN node is selected (e.g., using communication manager 150 and/or selection component 1008, depicted in FIG. 10) using machine learning and the one or more measurements.

In a third aspect, alone or in combination with one or more of the first and second aspects, the set of beams comprises SSB beams.

In a fourth aspect, alone or in combination with one or more of the first through third aspects, the set of beams comprises CSI-RS beams.

In a fifth aspect, alone or in combination with one or more of the first through fourth aspects, the one or more linear combinations are indicated in one or more rules stored in a memory of the RAN node.

In a sixth aspect, alone or in combination with one or more of the first through fifth aspects, process 800 further includes transmitting (e.g., using communication manager 150 and/or transmission component 1004) an indication of the one or more linear combinations in an SIB or an RRC message.

In a seventh aspect, alone or in combination with one or more of the first through sixth aspects, the indication comprises one or more QCL indications that associate each linear combination, of the one or more linear combinations, with a plurality of beams of the set of beams.

In an eighth aspect, alone or in combination with one or more of the first through seventh aspects, the indication includes a set of coefficients for each linear combination.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a measurement component 908, among other examples.

In some aspects, the apparatus 900 may be configured to perform one or more operations described herein in connection with FIGS. 4-6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

In some aspects, the measurement component 908 may measure one or more linear combinations of a set of beams (e.g., from the apparatus 906, such as a RAN node). In some aspects, the measurement component 908 may include one or more antennas, a modem, a demodulator, a MIMO detector, a receive processor, a controller/processor, a memory, or a combination thereof, of the UE described in connection with FIG. 2. Accordingly, the transmission component 904 may transmit a report, based at least in part on the measuring, to the apparatus 906.

In some aspects, the reception component 902 may receive an indication of the one or more linear combinations in an SIB or an RRC message.

In some aspects, the reception component 902 may receive an indication of a beam, of the set of beams, to be used by the RAN node.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

FIG. 10 is a diagram of an example apparatus 1000 for wireless communication. The apparatus 1000 may be a RAN node, or a RAN node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a selection component 1008, among other examples.

In some aspects, the apparatus 1000 may be configured to perform one or more operations described herein in connection with FIGS. 4-6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

In some aspects, the transmission component 1004 may transmit one or more linear combinations of a set of beams (e.g., to the apparatus 1006, such as a UE). Accordingly, the reception component 1002 may receive a report including one or more measurements of the one or more linear combinations.

In some aspects, the transmission component 1004 may transmit an indication of a beam, of the set of beams, to be used by the apparatus 1000. For example, the selection component 1008 may select the beam to be used based on machine learning and the one or more measurements. In some aspects, the selection component 1008 may include a MIMO detector, a receive processor, a transmit MIMO processor, a transmit processor, a controller/processor, a memory, or a combination thereof, of the base station described in connection with FIG. 2.

In some aspects, the transmission component 1004 may transmit an indication of the one or more linear combinations in an SIB or an RRC message.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: measuring one or more linear combinations, of a set of beams, from a radio access network (RAN) node; and transmitting a report, based at least in part on the measuring, to the RAN node.

Aspect 2: The method of Aspect 1, further comprising: receiving an indication of a beam, of the set of beams, to be used by the RAN node.

Aspect 3: The method of any of Aspects 1 through 2, wherein the set of beams comprises synchronization signal block (SSB) beams.

Aspect 4: The method of any of Aspects 1 through 2, wherein the set of beams comprises channel state information—reference signal (CSI-RS) beams.

Aspect 5: The method of any of Aspects 1 through 4, wherein the one or more linear combinations are indicated in one or more rules stored in a memory of the UE.

Aspect 6: The method of any of Aspects 1 through 5, further comprising: receiving an indication of the one or more linear combinations in a system information block (SIB) or a radio resource configuration (RRC) message.

Aspect 7: The method of Aspect 6, wherein the indication comprises one or more quasi-co-location (QCL) indications that associate each linear combination, of the one or more linear combinations, with a plurality of beams of the set of beams.

Aspect 8: The method of any of Aspects 6 through 7, wherein the indication includes a set of coefficients for each linear combination.

Aspect 9: A method of wireless communication performed by a radio access network (RAN) node, comprising: transmitting one or more linear combinations of a set of beams; and receiving a report including one or more measurements of the one or more linear combinations.

Aspect 10: The method of Aspect 9, further comprising: transmitting an indication of a beam, of the set of beams, to be used by the RAN node.

Aspect 11: The method of any of Aspects 9 through 10, wherein the beam to be used by the RAN node is selected using machine learning and the one or more measurements.

Aspect 12: The method of any of Aspects 9 through 11, wherein the set of beams comprises synchronization signal block (SSB) beams.

Aspect 13: The method of any of Aspects 9 through 11, wherein the set of beams comprises channel state information—reference signal (CSI-RS) beams.

Aspect 14: The method of any of Aspects 9 through 13, wherein the one or more linear combinations are indicated in one or more rules stored in a memory of the RAN node.

Aspect 15: The method of any of Aspects 9 through 14, further comprising: transmitting an indication of the one or more linear combinations in a system information block (SIB) or a radio resource configuration (RRC) message.

Aspect 16: The method of Aspect 15, wherein the indication comprises one or more quasi-co-location (QCL) indications that associate each linear combination, of the one or more linear combinations, with a plurality of beams of the set of beams.

Aspect 17: The method of any of Aspects 15 through 16, wherein the indication includes a set of coefficients for each linear combination.

Aspect 18: An apparatus for wireless communication at a device, comprising a processor; memory coupled with the processor; and instructions stored in the memory and executable by the processor to cause the apparatus to perform the method of one or more of Aspects 1-8.

Aspect 19: A device for wireless communication, comprising a memory and one or more processors coupled to the memory, the one or more processors configured to perform the method of one or more of Aspects 1-8.

Aspect 20: An apparatus for wireless communication, comprising at least one means for performing the method of one or more of Aspects 1-8.

Aspect 21: A non-transitory computer-readable medium storing code for wireless communication, the code comprising instructions executable by a processor to perform the method of one or more of Aspects 1-8.

Aspect 22: A non-transitory computer-readable medium storing a set of instructions for wireless communication, the set of instructions comprising one or more instructions that, when executed by one or more processors of a device, cause the device to perform the method of one or more of Aspects 1-8.

Aspect 23: An apparatus for wireless communication at a device, comprising a processor; memory coupled with the processor; and instructions stored in the memory and executable by the processor to cause the apparatus to perform the method of one or more of Aspects 9-17.

Aspect 24: A device for wireless communication, comprising a memory and one or more processors coupled to the memory, the one or more processors configured to perform the method of one or more of Aspects 9-17.

Aspect 25: An apparatus for wireless communication, comprising at least one means for performing the method of one or more of Aspects 9-17.

Aspect 26: A non-transitory computer-readable medium storing code for wireless communication, the code comprising instructions executable by a processor to perform the method of one or more of Aspects 9-17.

Aspect 27: A non-transitory computer-readable medium storing a set of instructions for wireless communication, the set of instructions comprising one or more instructions that, when executed by one or more processors of a device, cause the device to perform the method of one or more of Aspects 9-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
   measure a reference signal received power for one or more linear combinations, of a set of beams, from a radio access network (RAN) node;
   transmit a channel state information report, based at least in part on the measuring, to the RAN node, the channel state information report comprising:
   angular information associated with the one or more linear combinations, and
   a spatial signature corresponding to measurement values included in a set of reference signal received power measurements of the one or more linear combinations; and
   receive an indication of a beam of the set of beams, to be used by the RAN node wherein the beam to be used by the RAN node is selected using machine learning and the spatial signature.

2. The apparatus of claim 1, wherein the set of beams comprises synchronization signal block (SSB) beams.

3. The apparatus of claim 1, wherein the set of beams comprises channel state information-reference signal (CSI-RS) beams.

4. The apparatus of claim 1, wherein the one or more linear combinations are indicated in one or more rules stored in the one or more memories.

5. The apparatus of claim 1, wherein the one or more processors are further configured to:
   receive an indication of the one or more linear combinations in a system information block (SIB) or a radio resource configuration (RRC) message.

6. The apparatus of claim 5, wherein the indication comprises one or more quasi-co-location (QCL) indications that associate each linear combination, of the one or more linear combinations, with a plurality of beams of the set of beams.

7. The apparatus of claim 5, wherein the indication includes a set of coefficients for each linear combination.

8. An apparatus for wireless communication at a radio access network (RAN) node, comprising:
   one or more memories; and
   one or more processors, coupled to the one or more memories, configured to:
   transmit one or more linear combinations of a set of beams;
   receive a channel state information report including:
   a spatial signature corresponding to measurement values included in a set of reference signal received power measurements of the one or more linear combinations, and
   angular information associated with the one or more linear combinations; and
   transmit an indication of a beam of the set of beams, to be used by the RAN node wherein the beam to be used by the RAN node is selected using machine learning and the spatial signature.

9. The apparatus of claim 8, wherein the set of beams comprises synchronization signal block (SSB) beams.

10. The apparatus of claim 8, wherein the set of beams comprises channel state information-reference signal (CSI-RS) beams.

11. The apparatus of claim 8, wherein the one or more linear combinations are indicated in one or more rules stored in the one or more memories.

12. The apparatus of claim 8, wherein the one or more processors are further configured to:
    transmit an indication of the one or more linear combinations in a system information block (SIB) or a radio resource configuration (RRC) message.

13. The apparatus of claim 12, wherein the indication comprises one or more quasi-co-location (QCL) indications that associate each linear combination, of the one or more linear combinations, with a plurality of beams of the set of beams.

14. The apparatus of claim 12, wherein the indication includes a set of coefficients for each linear combination.

15. A method of wireless communication performed by a user equipment (UE), comprising:
    measuring a reference signal received power for one or more linear combinations, of a set of beams, from a radio access network (RAN) node; and
    transmitting a channel state information report, based at least in part on the measuring, to the RAN node, the channel state information report comprising:
    angular information associated with the one or more linear combinations, and
    a spatial signature corresponding to measurement values included in a set of reference signal received power measurements of the one or more linear combinations; and receiving an indication of a beam of the set of beams, to be used by the RAN node wherein the beam to be used by the RAN node is selected using machine learning and the spatial signature.

16. The method of claim 15, wherein the set of beams comprises synchronization signal block (SSB) beams.

17. The method of claim 15, wherein the set of beams comprises channel state information-reference signal (CSI-RS) beams.

18. The method of claim 15, wherein the one or more linear combinations are indicated in one or more rules stored in one or more memories of the UE.

19. The method of claim 15, further comprising:
receiving an indication of the one or more linear combinations in a system information block (SIB) or a radio resource configuration (RRC) message.

20. The method of claim 19, wherein the indication comprises one or more quasi-co-location (QCL) indications that associate each linear combination, of the one or more linear combinations, with a plurality of beams of the set of beams.

21. The method of claim 19, wherein the indication includes a set of coefficients for each linear combination.

22. A method of wireless communication performed by a radio access network (RAN) node, comprising:
transmitting one or more linear combinations of a set of beams;
receiving a channel state information report including:
a spatial signature corresponding to measurement values included in a set of reference signal received power measurements of the one or more linear combinations, and
angular information associated with the one or more linear combinations; and
transmitting an indication of a beam of the set of beams, to be used by the RAN node, wherein the beam to be used by the RAN node is selected using machine learning and the spatial signature.

23. The method of claim 22, further comprising:
transmitting an indication of the one or more linear combinations in a system information block (SIB) or a radio resource configuration (RRC) message.

24. The method of claim 23, wherein the indication comprises one or more quasi-co-location (QCL) indications that associate each linear combination, of the one or more linear combinations, with a plurality of beams of the set of beams.

25. The method of claim 23, wherein the indication includes a set of coefficients for each linear combination.

* * * * *